United States Patent [19]

Robey

[11] Patent Number: 4,670,162

[45] Date of Patent: Jun. 2, 1987

[54] HIGH THERMAL FLUX DENSITY WET OXIDATION STEAM GENERATOR

[75] Inventor: Herbert L. Robey, Milton, Canada

[73] Assignee: Canadian Patents and Development Limited-Societe Canadien ne des Brevets et d'Exploitation Limitee, Ottawa, Canada

[21] Appl. No.: 820,015

[22] Filed: Jan. 21, 1986

[30] Foreign Application Priority Data

Jan. 30, 1985 [CA] Canada .................................. 473168

[51] Int. Cl.⁴ ............................................... C02F 1/68
[52] U.S. Cl. ..................................... 210/761; 422/184
[58] Field of Search ................... 210/761, 762, 758; 422/129, 184

[56] References Cited

U.S. PATENT DOCUMENTS 3,852,192 12/1974 Fassell et al. ..................... 210/761
4,229,296 10/1980 Wheaton et al. .................. 210/758

Primary Examiner—Frank Sever

Attorney, Agent, or Firm—Shoemaker and Mattare, Ltd.

[57] ABSTRACT

A wet air oxidation process for oxidizing organic matter dispersed in a liquid feed stream at controlled high temperatures and pressures is capable of treating concentrations of organic matter in the feed stream far in excess of concentrations of organic matter treated in the normal type of wet air oxidation process. The improvement in the process is in the provision of a vapor phase effluent from the reactor system which is considerably greater than normal due to the introduction of high volumes of the oxidizing gas. This provides for increased concentrations of organic matter in the feed stream; however, resulting in the generation of excess energy within the reactor system which cannot be removed in the vapor and liquid phase effluents from the reactor system. The process is adapted to recover this excess energy from the reactor system to permit the reactor system to continue operating within the controlled high temperatures and high pressures, yet well outside of the normal physical-chemical equilibrium operating conditions for the reactor system.

9 Claims, 1 Drawing Figure

HIGH THERMAL FLUX DENSITY WET OXIDATION STEAM GENERATOR

FIELD OF THE INVENTION

This invention relates to the wet air oxidation at elevated temperatures and pressures of organic matter in a liquid feed stream.

BACKGROUND OF THE INVENTION

Wet oxidation of organics at high pressures and temperatures has been predominantly used in the field of waste management for applications such as removing pollutants from organic processing installations, pulp and paper operations, milk processing operations and the like. U.K. Patent Specification No. 706,686 discloses a wet oxidation process adapted to the above uses and is additionally usable to generate steam energy from low grade powder coals by the wet oxidation of slurry coals. The process involves introducing to a reactor at high temperature and pressure a waste stream and air which are mixed within the reactor. The organics in the feed stream react with the oxygen in the air stream to produce mainly carbon dioxide and water. The reaction is exothermic with the consequent generation of heat. Providing the reaction is controlled, organics in a liquid feed stream can be oxidized to produce harmless products for discharge into the environment. Many additional techniques have been developed in the area of wet oxidation systems such as disclosed in U.K. Patent No. 812,832 and U.S. Pat. Nos. 3,852,192; 3,920,548; 4,155,848; 4,174,280; 4,217,218 and 4,229,296.

The wet air oxidation of low grade solid fuels as proposed in U.K. Patent No. 706,686 is attractive because the world's high grade fossil fuels are gradually being depleted. The lower quality solid fuels, that is, those with higher sulfur and ash content are being used more widely for stationary thermal energy and electrical power generation. There are two major and costly problems associated with dry incineration of low grade fuels. The higher sulfur content of the fuel results in unacceptable sulfur dioxide emissions, and expensive and problematic flue gas desulfurization is required. Boilers tend to be more complex in dealing with the low quality solid fuels because continuous ash removal equipment must be used to handle the high volumes of ash generated during combustion. In the wet air oxidation of the low grade fuels the coal is slurried with water and pumped into a high temperature and high pressure reactor. Air or oxygen is injected continuously either into the feed line preceding the reactor or the reaction vessel. The oxygen reacts with the organic materials to produce carbon dioxide, water and heat. Advantages of wet air oxidation of the low grade fuels is that the sulfur is oxidized to sulfuric acid (or sulfate salts) and the ash is essentially solubilized in the acidic slurry. Heat of reaction is removed from the vessel in the steam and liquid effluents such as disclosed by the technique in U.K. Patent No. 706,686. The effluents can either be used directly or heat exchanged to produce clean steam.

The major difficulty with the approach disclosed in U.K. Patent No. 706,686 and many other of the above noted patents is that only very dilute fuel: water slurries can be tolerated due to physical-chemical equilibrium within the unit. The quantities of air and organics introduced to the reactor system must be monitored and controlled to avoid excessive temperature increases due to heat of combustion and avoid run-away reactions. The net result, therefore, is low energy recovery per unit volume of reactor vessel. Attempts have been made to provide a degree of control on the temperature of the reaction. U.S. Pat. Nos. 3,852,192 and 4,229,296 involve the use of heat exchangers in the primary reaction zone to provide for initial heat-up of the reactor system in the primary zone and to control subsequently to a limited degree the temperature in the primary reaction zone. However, both patents are directed to the treatment of the dilute fuel to water slurries which are well within the safety margin of avoiding a run-away reaction.

SUMMARY OF THE INVENTION

The process, according to this invention, provides for significantly increased energy recovery per unit volume of reactor vessel by operating the reactor in a manner which can treat significantly increased concentrations of organics in the feed stream.

The wet oxidation process is carried out at controlled high temperatures and high pressures for oxidizing organic matter dispersed in a liquid feed stream. The process comprises feeding the feed stream into a reactor system and introducing an oxygen containing gas into the system to oxidize the organic matter at the controlled high temperatures and pressures in the reactor system. The organic matter may be slurried, pulverized low grade coal or petroleum upgrading products such as coke or pitch. The oxygen-containing gas may be air, oxygen enriched air or oxygen. A vapor phase effluent is removed from the reactor system along with a liquid phase effluent, both of which contain the reaction products of oxidizing the organic matter in the feed stream. A humidity ratio under normal physical-chemical equilibrium operating conditions for the reactor system determines a flow rate of the oxygen containing gas, a rate of vapor phase effluent removal and an amount of the organic matter to be oxidized in the reactor system per unit of time for an energy balanced reactor system. According to this invention, the improvement comprises for a rate of vapor phase effluent in excess of a rate of vapor phase effluent production in the reactor system operating under normal physical-chemical equilibrium, introducing to the reactor system per unit of time significantly larger amounts of the organic matter and the oxygen containing gas. The energy produced from heat of combustion of the organic matter is in excess of energy in the reactor system which is removed in the vapor phase effluent and the liquid phase effluent. The excess energy is recovered from the reactor system via a heat exchange means independent of the feed stream, oxygen containing gas, vapor phase effluent and liquid phase effluent to maintain operation of the reactor system at the controlled high temperatures and pressures while operating the reactor system outside of the normal physical-chemical equilibrium conditions. This provides significant higher energy recovery per unit volume of reactor system.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
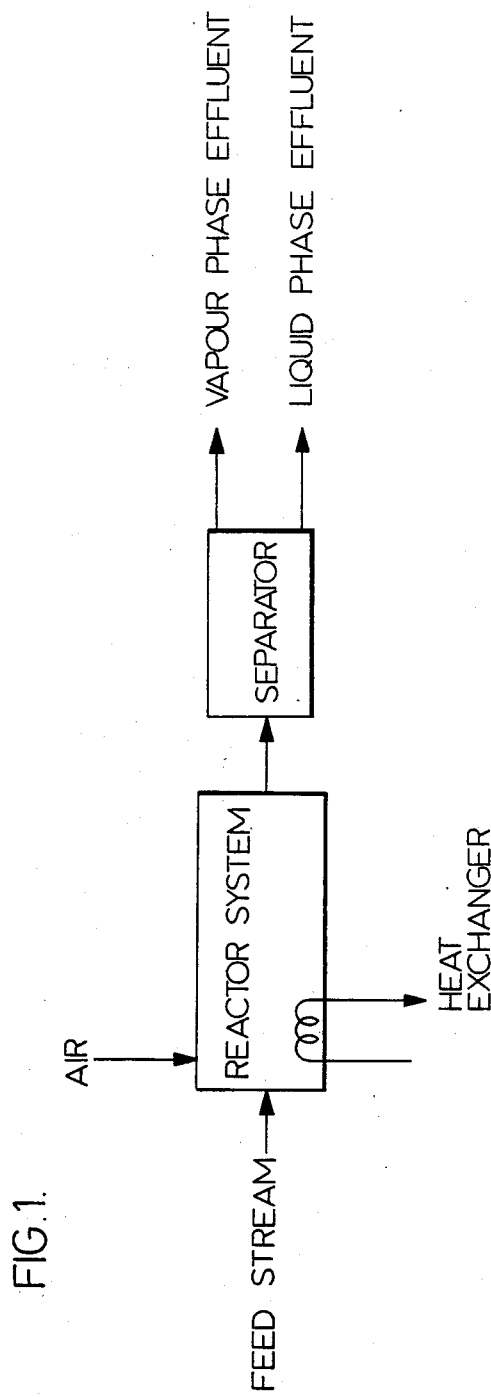
FIG. 1 is a schematic process flow diagram showing the reactor system in which a preferred embodiment of the inventive process is carried out.

In conventional wet oxidation processes, heat removal from the system is determined by the quantity of heat that can be removed in the vapor phase effluent and the liquid phase effluent. In operating a reactor system within the normal physical-chemical equilibrium operating conditions, the maximum amount of organic matter and air introduced into the system is thereby determined. Knowing the rate of oxidation of the organics for a given feed stream and the energy produced by the heat of combustion, the amount of organics in the feed stream has to the controlled to ensure that temperature does not begin to elevate to an extent that the auto thermal reaction moves into a run-away condition. This has been readily accomplished in the past by the processes disclosed in the above noted patents.

According to this invention, it has been determined that by a modification in the process of running the wet oxidation reactor system, the specific organic matter concentration in the feed stream can be significantly increased. According to this invention, there are two determinative factors to be considered in operating the reactor system in a condition which would normally result in a run-away reaction. The first to be considered is the humidity ratio which is the mass of steam contained per unit mass of oxidizing gas. The humidity ratio is a function of temperature and total pressure. The humidity ratio determines the amount of moisture that can be contained in the vapor phase effluent. Knowing the humidity ratio and assuming a certain vapor production rate, the air flow rate and hence the fuel concentration can be calculated. The humidity ratio is calculated as follows:

$$HR = \frac{\text{mol. wt. of water}}{\text{mol. wt. of gas}} \times \frac{A}{B - A} \quad \text{I}$$

wherein:
(i) mol. wt. is molecular weight;
(ii) A is the partial pressure of water vapor at the temperature of the reactor;
(iii) B is the total pressure of the system; and
(iv) HR=humidity ratio (wt steam/wt gas)

The second factor to be considered in operating the reactor system according to this invention, is the energy production. Normally the energy entering and produced within the process cannot exceed the energy removed in the liquid and vapor effluents. If this balance is not achieved, the temperature of the reactor can rise to a run-away condition. By selective manipulation of the process controllable variables, including temperature and pressure, energy production within the system can be increased to improve significantly the energy recovery per unit volume of reactor system.

The specific fuel concentration in the feed stream, that is organic matter concentration, if it is significantly increased and there is sufficient oxidizing gas present, the impact on the system will be that the heat output will correspondingly increase. According to this invention, the excess energy generated is recovered from the reactor system in a manner to maintain the desired elevated temperatures and pressures in the reactor system, yet avoid run-away reaction conditions.

In a normal wet oxidation system operating within safe ranges, the limits with respect to the concentration of organic matter in the feed stream can be explained with reference to FIG. 1. Based on the developments in the prior art wet oxidation systems, the behavior of the system can be reasonably predicted by humidity ratio and energy balance calculations. For a reactor temperature of approximataly 300° C. and a total pressure in the range of 14 MPa (Mega Pascals) wherein heat losses are negligible, the following calculations are made to arrive at the upper limit of organic matter concentration in the feed stream. The allowable fuel concentration, i.e., concentration of organic matter in the feed stream, is a function of the humidity ratio and the process energy balances. Assuming air as the oxidant, the humidity ratio becomes:

$$HR = 10.7 \frac{\text{kg steam}}{\text{kg air}} \quad \text{II}$$

Assuming for complete combustion, that 2.5 kg of oxygen per kg of solid fuel is required and knowing that there is 0.2314 kg of oxygen per kg of air, then the humidity ratio of formula II becomes:

$$HR = 10.7 \frac{\text{kg steam}}{\text{kg solid fuel}} \quad \text{III}$$

The second determinant in operating the reactor system is to maintain an energy balance, which is developed as follows:

$$E_C + E_F = E_V + E_L + E_E \quad \text{IV}$$

wherein
$E_C$ = the heat of combustion
$E_F$ = heat contained in liquid feed to reactor
$E_V$ = heat removed in the vapor phase effluent
$E_L$ = heat removed in the liquid phase effluent
$E_E$ = excess energy remaining in the reactor system not removed in the vapor and liquid phase effluents The energy balance may be expressed as follows:

$$m_f \times H_c \times e + m_f \times C_p \times T_F = H_{ST} \times m_V + m_L \times C_p \times T_R + E_E \quad \text{V}$$

wherein
$m_f$ = mass flow rate of fuel (kg/time unit)
$H_c$ = heating value of fuel (MJ/kg)
e = oxidation efficiency
$m_f$ = mass flow rate of feed liquid (kg/time unit)
$T_F$ = feed temperature (° C.)
$m_V$ = mass flow rate of VPE (kg/time unit)
$m_L$ = mass flow rate of LPE (kg/time unit)
$T_R$ = reaction temperature (° C.)
$E_E$ = excess heat produced during reaction, which exceeds VPE+LPE removal limits
VPE = vapour phase effluent
LPE = liquid phase effluent
$C_p$ = specifc heat of water
$H_{ST}$ = enthalpy of steam Providing for:
$m_F$ = 100 kg/time unit
$H_c$ = 35 MJ/kg
e = 0.9
$T_F$ = 50° C.
$T_R$ = 300° C.
$E_E$ = 0
$C_p$ — 0.0044 MJ/kg/° C.
$H_{ST}$ — 2.5 MJ/kg
and knowing:

$$m_L = m_f - m_V$$

the above equation reduced to two unkowns:

$$31.5 \, m_f = 1.18 \, m_V = 110 \text{ MJ/kg of liquid}$$

or $$31.5 \, MJ = \frac{1.18 \, m_V}{m_f} + \frac{110}{m_f} \qquad \text{VI}$$

Knowing that $HR = m_V/m_f$ and substituting into equation VI, the solution is $m_f = 5.82$ kg/time unit
$m_V = 62.4$ kg/time unit
$m_L = 36.7$ kg/time unit For the above analyzed system operating under normal conditions in maintaining the physical-chemical equilibrium in the reactor system, the feed includes a concentration of 5.82% by weight of organics with a mass flow rate of vapor effluent of 62.4% by weight. By introducing the features of this invention, the effectiveness of the reactor system can be considerably increased.

The humidity ratio does not change because the humidity ratio is based on parameters which remain the same in either the prior art systems or the systems according to this invention. The energy balance is modified, however, because $E_E$, the excess heat generated is not known. Therefore, equation V becomes:

$$31.5 = \frac{1.18 \, m_v}{m_f} + \frac{110}{m_f} + \frac{E_E}{m_f} \qquad \text{VII}$$

Providing for a vapor phase effluent of 80% by weight of the feed flow rate, direct substitution of this value into the humidity ratio expression provides a solid fuel weight of 7.48% by weight per time unit. Substituting this value for $m_f$ in the above equation VII solve, $E_E$ equals 31.2 MJ per unit of time. To maintain reactor temperature and prevent a run-away condition in the reactor system, 31.2 MJ per unit of time is recovered from the unit. As shown in FIG. 1, a heat exchanger is provided in the reactor system to recover the excess heat from the reactor to provide for a controlled reaction even though the parameters are normally outside of the physical-chemical equilibrium operating conditions for the reactor system. The heat exchanger includes a cooling coil where heat exchange medium flows through the coil to recover heat from the reactor system and maintain the temperature of the reaction at the desired level of approximately 300° C. The heat recovery fluid may be cooling water or oil which removes the excess energy from the reaction system. The flow rate of the heat recovery fluid is determined by the desired temperature for the reaction. As the temperature in the reactor system is monitored, a controller controls a valve or the like in the heat exchanger coil to either increase or decrease the flow rate of the heat recovery fluid depending upon the corresponding increase or decrease of monitored reactor temperature. In this manner, the reactor temperature is maintained fairly constant at the desired level of 300° C. Should boiler feed water be used as the heat recovery fluid in the heat exchanger, the water, after having passed through the heat exchange coil, is flashed into steam. The steam may then be used for electrical power generation or for space and/or process heating requirements.

The total heat output for the normal system with the balanced physical-chemical equilibrium operating conditions provides total energy output which is the sum of $E_v$ plus $E_L$ which equals 203.7 MJ per unit of time. Compared to this, the total heat output of the system, according to this invention, is 261.8 MJ per unit of time which is the sum of $E_v$ plus $E_L$ plus $E_E$. Therefore, the process according to this invention can provide considerably greater heat output per unit volume of reactor. The vapor phase production rate is considerably higher, according to this invention, which is 80% by weight compared to the 62.4% by weight of the normal system which is an increase of approximately 28% for the particular embodiment discussed. In the production of greater quantities of vapor phase effluent and considering that the wet oxidation reaction occurs in the liquid phase, greater residence time in the liquid phase is obtained within the reactor. According to this invention, to realize the same heat output compared to a conventional wet oxidation system, the reactor system would be approximately one-half the size of the conventional unit. The heat exchange coils within the reactor system would occupy a small volume within the reactor due to the rapid heat of transfer caused by the turbulent environment within the reactor system.

Accordingly, the process of this invention can treat organic matter concentration in the feed stream ranging from 5% to 30% by weight. For example, with 60 to 90% by weight vapor phase effluent and 10 to 40% by weight liquid phase effluent, these above concentration ranges for the organic matter may be treated in the feed stream. The reactor system temperatures are preferably in the range of 170° C. to 340° C. and pressures of 5 to 21 MPa.

Considering the use of the wet oxidation reactor system, according to this invention, for in situ oil recovery, the energy of the vapor phase effluent is used as follows. Production of high temperature water approximately 280° C. can be accomplished. The high temperature water can be passed through a steam generator for high pressure steam production. Assuming 280° C. water and 80% quality injection steam desired for high pressure steam injection in oil recovery, about 60% of the total enthalpy necessary is contained as a sensible heat in the high temperature water. Therefore, fossil fuel operating costs and steam generator size would be correspondingly decreased in accordance with this invention. Production of low pressure, approximately 6.4 MPa process steam is available from the reactor system for on site electrical generation or heat requirements.

It is appreciated that from the separator even higher steam production can be achieved although normally the production would not exceed 95% of the water feed.

The reactor may be a multi-stage device such as disclosed in U.S. Pat. No. 3,920,548. Within each compartment, a heat exchange coil is used. A control valve is provided for each coil in the respective compartment. By monitoring the temperature in each compartment, the flow rate of heat recovery fluid may be varied to maintain the temperature in that compartment within the desired operating range which may be permitted to fluctuate between 270° C. to 300° C. The heat recovery fluid from each of the heat exchangers of the compartments is then processed in accordance with the standard techniques to recover the energy from the fluid for purposes of generating power or heating.

The advantages of this wet oxidation system which provides for greater heat production from the unit size of reactor is that all sulfur in the low grade fuels is converted to soluble sulfates thereby eliminating sulfur dioxide emission associated with dry combustion techniques in standard thermogenerating systems. The metals contained in the solid fuel are solubilized and concentrated by a factor of up to 10 and therefore provide potential recoverable resources. High energy efficiencies are realized due to energy being released in the liquid phase or by direct evaporation. In accordance with this invention more of the effluent exiting the system as steam can be reused directly as a steam source or can be condensed for reuse as a reasonably clean water source, which is suitable for the aforementioned in situ oil sands recovery applications.

Although preferred embodiments of the invention have been described herein in detail, it will be understood by those skilled in the art, that variations may be made thereto without departing from the spirit of the invention or the scope of the appended claims.

The embodiments of the invention in which an exclusive property or priviledge is claimed are defined as follows:

1. In a wet air oxidation process at controlled high temperatures and high pressures for oxidizing excessive amount of organic matter dispersed in a liquid feed stream comprising feeding said feed stream into a reactor system and introducing an increased amount of oxygen containing gas into said system to oxidize said excessive amount of organic matter without exceeding said controlled high temperatures and pressures in said reactor system, removing from said reactor system a vapor phase effluent and a liquid phase effluent which contain the reaction products of oxidizing said organic matter in said feed stream, a humidity ratio under normal physical-chemical equilibrium operating condition for said reactor system determining;
   (i) a flow rate of said oxygen containing gas,
   (ii) a rate of vapor phase effluent removal, and
   (iii) an amount of said organic matter to be oxidized in said reactor system per unit of time for an energy balanced reactor, the improvement comprising for a rate of said vapor phase effluent from said reactor in excess of a rate of vapor phase effluent from said reactor system operating under normal physical-chemical equilibrium, introducing to said reactor system per unit of time said excessive amounts of said organic matter of up to and including 30% by weight and said increased amount of oxygen-containing gas to produce thereby energy from heat of combustion of said organic matter which is in excess of energy in said reactor system which is removed in said vapor phase effluent and said liquid phase effluent, recovering said excess energy from said reactor system via a heat exchanger means independent of said feed stream, oxygen-containing gas, vapor phase effluent and liquid phase effluent to maintain operation of said reactor system at said controlled high temperatures and pressures while operating said reactor system outside of said normal physical-chemical equilibrium operating conditions to provide significantly higher energy recovery per unit volume of reactor system.

2. In a process of claim 1, said feed stream having concentrations of organics in the range of 5% to 30% by weight of said organic matter per unit weight of said feed stream.

3. In a process of claim 2, said organic matter being pulverized low grade coal.

4. In a process of claim 2, said organic matter being petroleum upgrading by-products.

5. In a process of claim 2, for 100 units of said feed stream per unit of time, 60 to 90 units of vapor phase effluent and 10 to 40 units of liquid phase effluent are produced per unit of time.

6. In a process of claim 5, said combustion of said organics is approximately 90% efficient.

7. In a process of claim 1, said oxygen-containing gas being selected from the group of gases consisting of air, oxygen enriched air and oxygen.

8. In a process of claim 1, said controlled temperature ranging from 170° to 340° C. and said controlled pressure ranging from 5 to 21 MPa.

9. In a process of claim 1, said heat exchanger means being a heat exchange coil placed in said reactor system, passing a medium through said coil at a rate to recover said excess energy in the form of heat from said reactor system.

* * * * *